(12) United States Patent
Freedman

(10) Patent No.: US 6,942,887 B1
(45) Date of Patent: Sep. 13, 2005

(54) COFFEE ROASTER AND METHOD

(76) Inventor: Jeffrey Freedman, 139 Knollwood Dr., Watchung, NJ (US) 07069-6245

(*) Notice: Subject to any disclaimer, the term of this patent is extended or adjusted under 35 U.S.C. 154(b) by 449 days.

(21) Appl. No.: 10/043,873

(22) Filed: Jan. 10, 2002

Related U.S. Application Data
(60) Provisional application No. 60/261,124, filed on Jan. 12, 2001.

(51) Int. Cl.[7] ............................. A23L 1/01; A23N 12/00
(52) U.S. Cl. ......................... 426/466; 34/576; 34/594; 99/286; 99/474; 99/483; 426/467
(58) Field of Search ................................. 426/466, 467, 426/520; 99/286, 323.5, 474, 476, 483; 34/576, 586, 594

(56) References Cited

U.S. PATENT DOCUMENTS

| | | |
|---|---|---|
| 270,503 A | 1/1883 | Stopple |
| 4,178,843 A | 12/1979 | Crabtree et al. |
| 4,196,342 A | 4/1980 | Chailloux |
| 4,325,191 A | 4/1982 | Kumagai et al. |
| 4,425,720 A | 1/1984 | Elevitch |
| 4,455,763 A | 6/1984 | Elevitch |
| 4,484,064 A | 11/1984 | Murray |
| 4,489,506 A | 12/1984 | Brown et al. |
| 4,494,314 A | 1/1985 | Gell, Jr. |
| 4,602,147 A | 7/1986 | Gell |
| 4,683,666 A | 8/1987 | Igusa et al. |
| 5,269,072 A | 12/1993 | Waligorski |
| 5,355,783 A | 10/1994 | Cochran |
| 5,359,788 A | 11/1994 | Gell, Jr. |
| 5,368,875 A | 11/1994 | Hibi et al. |
| 5,441,344 A * | 8/1995 | Cook, III .................... 374/141 |
| 5,500,237 A | 3/1996 | Gell, Jr. et al. |
| 5,564,331 A | 10/1996 | Song |
| 5,609,097 A | 3/1997 | Newnan |
| 5,749,288 A | 5/1998 | Skaling |
| 5,902,623 A | 5/1999 | Cochran |
| 5,943,790 A | 8/1999 | Gell, Jr. |
| 5,958,494 A * | 9/1999 | Tidland et al. .............. 426/466 |
| 6,000,144 A | 12/1999 | Bussman et al. |
| 6,036,988 A | 3/2000 | Lemme et al. |
| 6,051,266 A * | 4/2000 | Totsuka ...................... 426/466 |
| 6,065,226 A | 5/2000 | Gell, Jr. |

FOREIGN PATENT DOCUMENTS

JP 62-058977 * 3/1987

OTHER PUBLICATIONS

Abstract of U.S. Patent No. 3964175, Jun. 22, 1976, Sivetz.
Abstract of U.S. Patent No. 4326114, Apr. 20, 1982, Gerling, et al.
Abstract of U.S. Patent No. 6123971, Sep. 26, 2000, Tedesco.
Abstract of U.S. Patent No. 5481962, Jan. 9, 1996, Tedesco.
Abstract of U.S. Patent No. 5614239, Mar 25, 1997, Tedesco.
Abstract of U.S. Patent No. 6214397, Apr. 10, 2001, Tidland.
Abstract of U.S. Patent No. 5272299, Dec. 21, 1993, Ovadia.
Abstract of U.S. Patent No. 5083502, Jan. 28, 1992, Enomoto.
Home Coffee Roasting: The Next Trend, Tea & Coffee Trade Journal, pp. 49–62, Reader Service No. 39.

* cited by examiner

*Primary Examiner*—George C. Yeung
(74) *Attorney, Agent, or Firm*—Edward Dreyfus, Esq.

(57) ABSTRACT

A method and apparatus for pan roasting a mass of green coffee beans at rest by heat conduction from the pan bottom to the beans mass. A glass cover and smoke filter closes the roasting chamber. A radial blower operates at slow speed to draw ambient air and vacate smoke from the chamber to permit visual monitoring of roasting beans. Periodically, the fan can operate a high speed for a short time to mix or swirl the bean mass without substantial cooling them. The blower can sequence through high and low speed cycles until roasting completes and heating ceases. A high speed cool down phase removes remaining chaff, smoke, and quick cools the beans to preserve freshness. Electric power drives the blower and resistant heating element. The system enables the operator to use appearance, sound, smell, and time to determine roasting completeness.

55 Claims, 4 Drawing Sheets

COFFEE ROASTER AND METHOD

RELATED APPLICATION

U.S. Provisional Application Ser. No. 60/261,124, priority claimed.

BACKGROUND

Green unroasted coffee beans remain useful for extensive time periods. When roasted, unground coffee beans begin to lose flavor in a day and shall have lost almost all flavor in a week. Ground coffee deteriorates even faster.

As the people become more sophisticated about food and coffee, the consumer market demand grows for better quality coffee beverages. Specialized coffee shops have arisen to meet this demand. However, many of these shops provide no in-store roasting. Roasted beans are shipped from a central location to shops all over the country. The coffee served at these shops has spent the prime of its life in transit. The pre-roasted whole-bean coffee one buys in supermarkets is even older.

Freshly roasted and ground coffee is vastly superior compared with these pre-roasted products. Various systems are known that attempt to roast green coffee beans and otherwise process them shortly before grinding and using them to make fresh coffee. See for example, U.S. Pat. Nos. 3,964,175, 4,326,114, and 6,123,971. These disclosures recognize the value of rapid cool down of roasted beans but suffer from various process steps that prevent production of a good quality product. For example, these systems fail to enable the operator to visually inspect the roasting bean color to control various process steps that can produce a better quality final roasted bean.

Various characteristics of the roasting beans can be used to indicate or measure quality during the roasting and cooling cycle, such as the color of the roasting beans, smell of the rising aroma, crackling sounds of the beans, and the length of time, roasting energy consumed, and bean temperature. Technical problems must be solved to effectively use one or more of these characteristics. For example, the generally known fluidized bed coffee bean roaster uses streams of radiantly heated hot air to carry, circulate, and roast the beans. However, the operator of these systems cannot observe the individual bean color but only a swirling mass during the roasting. Operation of other household units of the drum type cannot visually inspect the beans while roasting. All of these units do not attempt to minimize the smoke produced such that they need to be vented or used outside to avoid creating a polluted environment. Similarly many of these units fail to collect chaff and spread chaff over an already polluted environment. Most of the household fluidized bed units roast only 2 to 3 oz. (¼ to ½ cup) of green beans and have little tolerance for different amounts. These limitations are due to design but are mainly due to the principles of operation and power use of the fluidized bed devices.

SUMMARY OF EXEMPLARY EMBODIMENTS OF THE PRESENT INVENTION

The roasters according to the principles of the present invention provide substantial benefits over previously known systems and enable the operator to use one or a combination of up to all of the above mentioned characteristics of roasting coffee beans while avoiding or solving the above mentioned technical problems.

One exemplary embodiment according to this invention includes a small batch coffee roaster for the home and restaurant markets to produce automatically a repeatable roast coffee bean in the ½–4 green bean cup range (3 oz. to 1⅓ lbs.) which will give optimal control of roasting bean color which is the main determinant of doneness, fast cooling of the beans once roasting is complete, collection of chaff, and elimination of most smoke and odor. This embodiment enables the operator to smell a small amount of smoke and to listen for crackling sounds as a further or alternate indication of doneness.

Another exemplary embodiment according to the principles of the present invention includes an alternate more effective chaff catching, smoke filtering, and processing design and technique. This embodiment lends itself well to not only ½–4 cups of green beans including, if desired, one or more layers of beans for home or commercial use.

All embodiments are capable of providing a roasting method that preferably substantially roasts the beans by conduction heating when they are at the rest so that color can be observed through a transparent cover. As roasting heat is applied by conduction, a blower exhausts the air and steam through a filter that traps most smoke particles and circulates air within the pan at an air speed that does not disturb the resting, roasting beans. It is preferred, for multiplayer roasting beans, that the blower move the air at high speed to agitate, stir, or circulate the beans for a short time and then cut-off or gradually reduce to low speed to allow the beans to come to rest again for at-rest roasting. Because the blower operates at increased speed for one or more short time periods, the beans retain most of their residual heat and are not significantly cooled while they are stirred or swirled about the roasting chamber. The roasting continues with the beans retaining most of their residual heat when the blower speed is reduced and the beans come to rest. Preferably, the heater continues to supply heat energy through the at-rest roasting and the stirring cycles. As described below, these cycles repeat as necessary until the operator believes the beans are almost fully roasted. Due to exothermic processes within the beans they continue to heat up when external heat is removed so they are subject to external cooling slightly before the final roast color is seen. Although some chaff will be collected by air currents during the slow speed phase, most chaff will be collected during the high blower speed phase. The subject systems can roast the beans by a process that separates the roasting and cooling phases even though the roasting beans are air stirred because the residual heat of each bean is not removed until the final rapid cool down phase, more fully described below. Systems according to the principles of the present invention lend themselves well to use electricity as the only needed source of energy for all system functions.

DESCRIPTION OF DRAWINGS

Other and further benefits and advantages of systems and methods according to the principles of the present invention will become apparent with the following detailed description of exemplary embodiments when taken in view of the appended drawings, in which.

DETAILED DESCRIPTION OF EXEMPLARY EMBODIMENTS OF THE INVENTION

Figure 1:
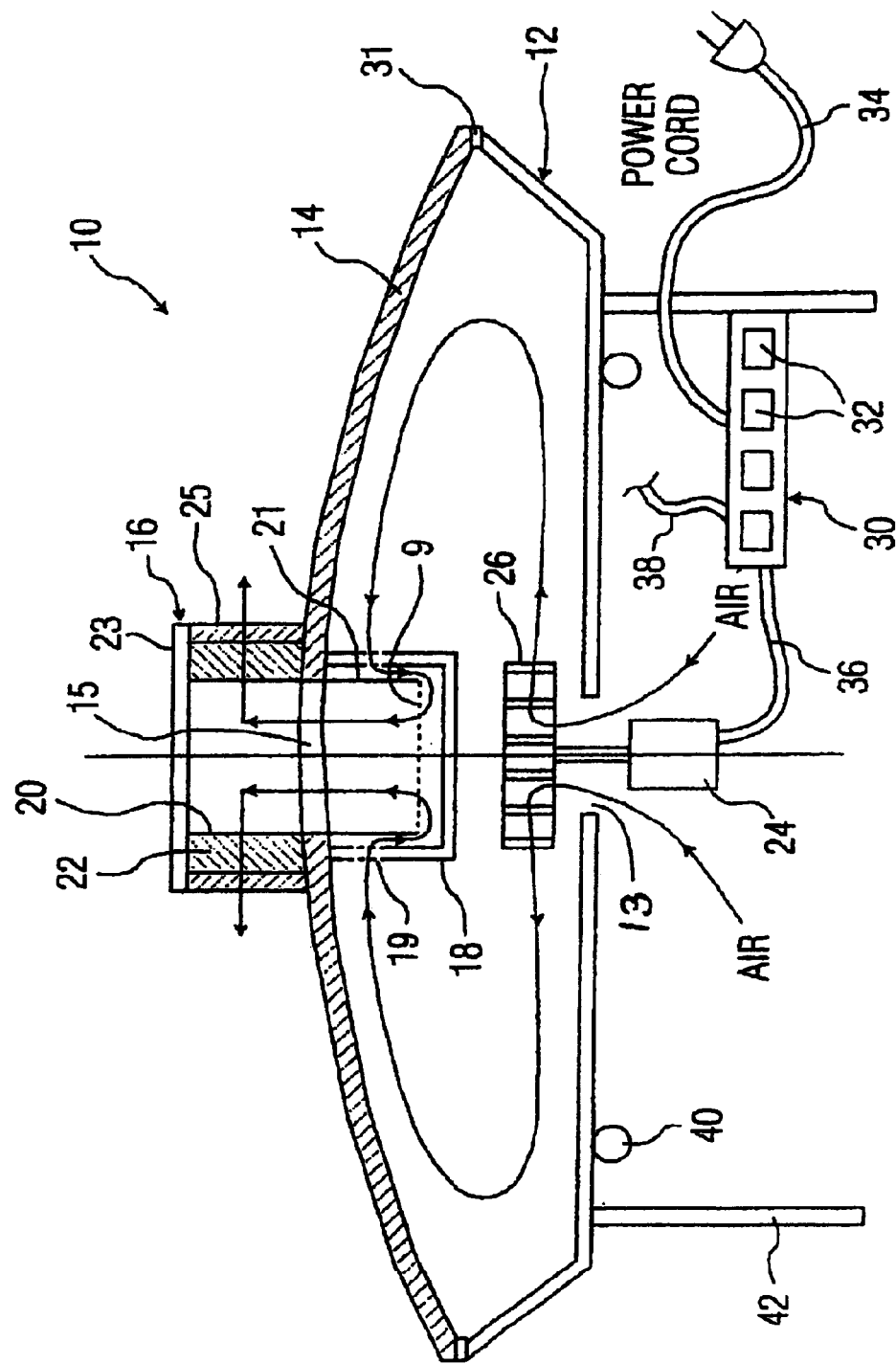
FIG. 1 is a pictorial view of a vertical cross section through the center of one exemplary embodiment according to the principles of the present invention.
Figure 2:
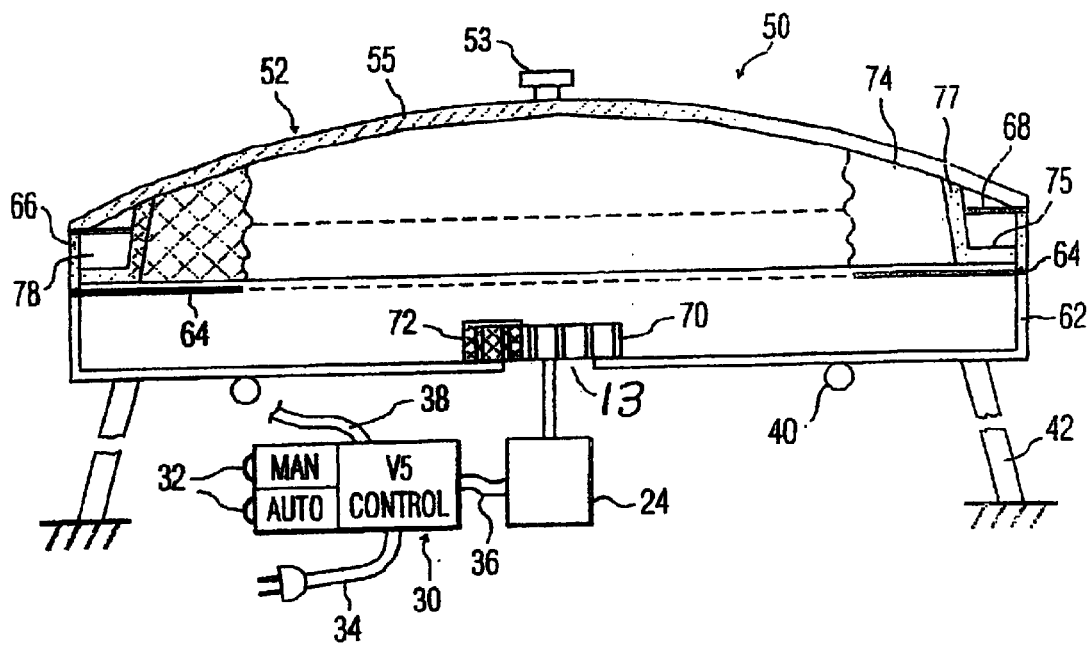
FIG. 2 is similar to FIG. 1 showing an alternate embodiment according to the principles of the present invention.
Figure 3:
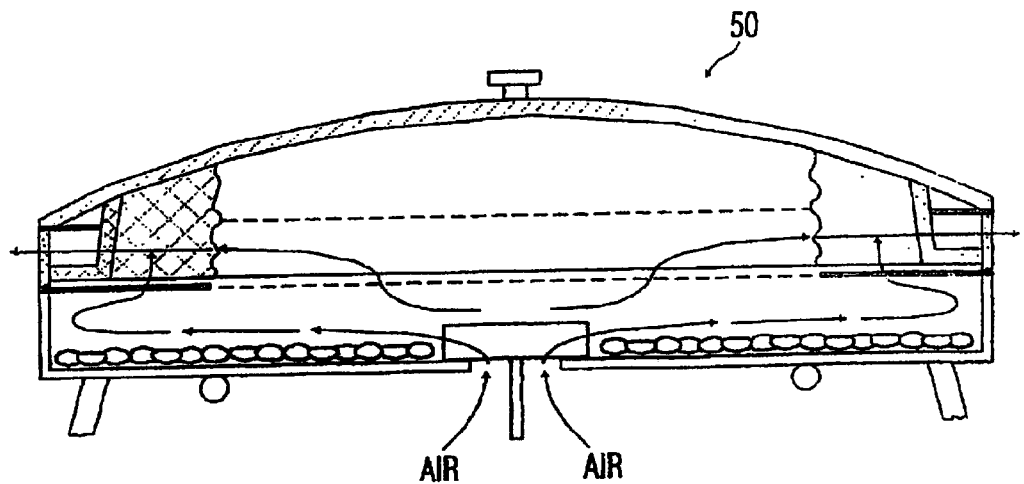
FIG. 3 is similar to FIG. 2 showing a single layer of beans therein and the general airflow paths generated by the blower at low speed.
Figure 4:
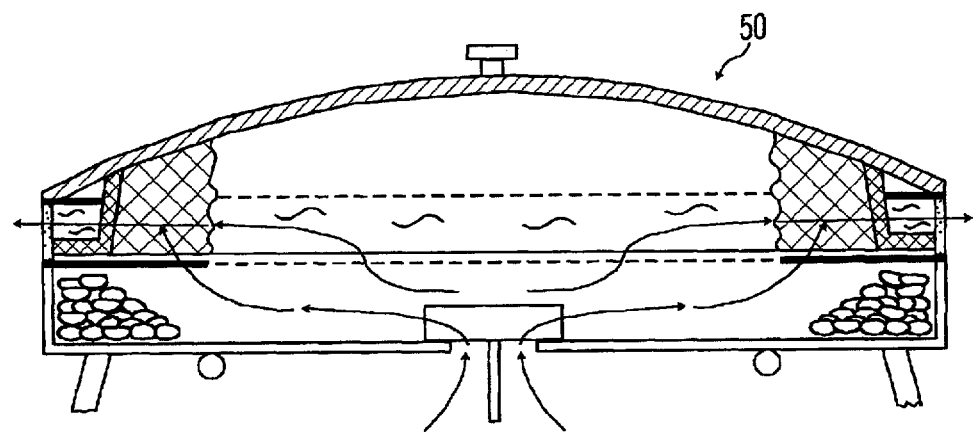
FIG. 4 is similar to FIG. 3 depicting the beans and airflow and chaff with the blower at high speed.
Figure 5:
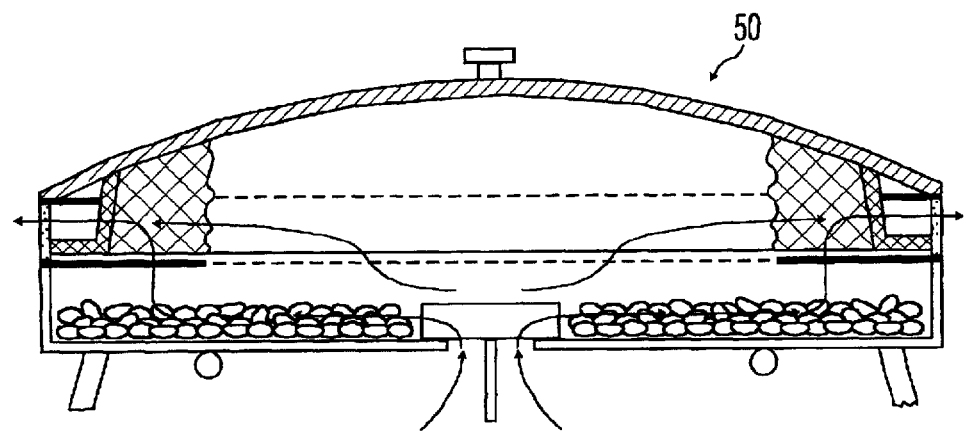
FIG. 5 is similar to FIG. 3 depicting a multi-layer mass of green beans in the pan.
Figure 6:
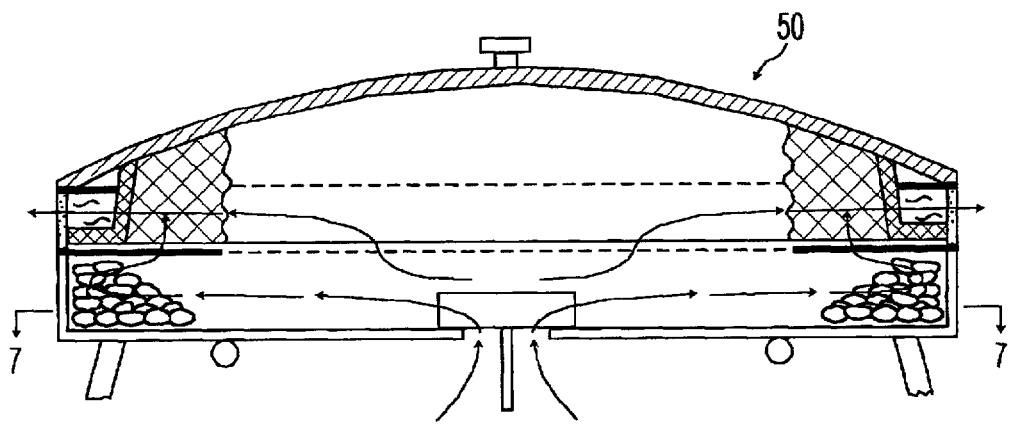
FIG. 6 is similar to FIG. 5 depicting the beans during high blower speed.
Figure 7:
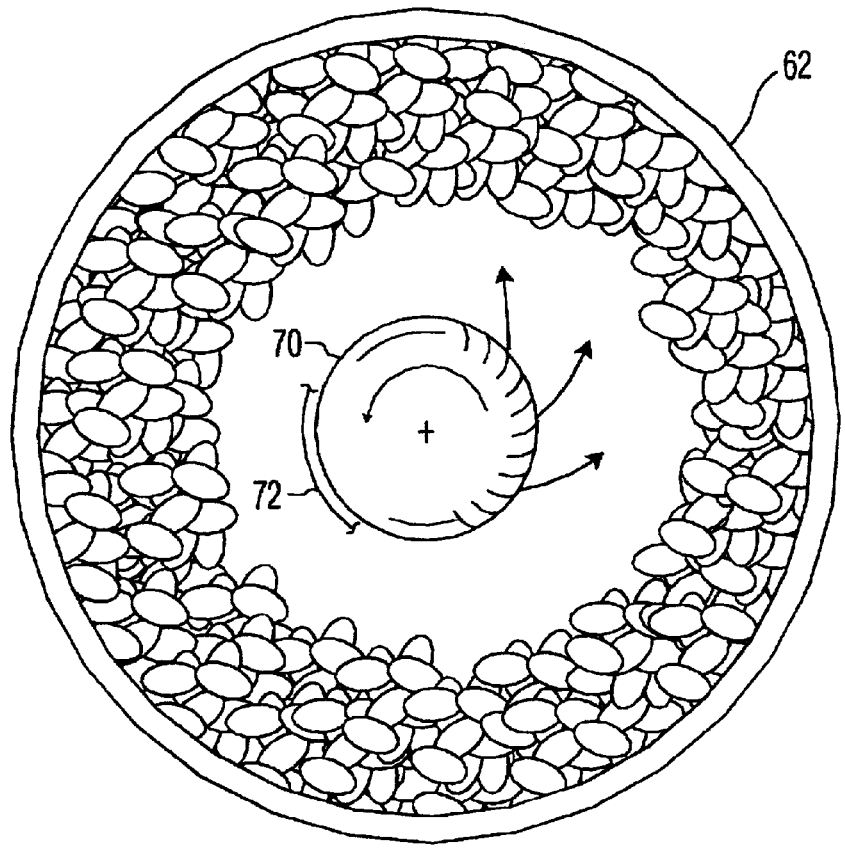
FIG. 7 is a section view of the pan and beans taken along line 7—7 of FIG. 6.
Figure 8:
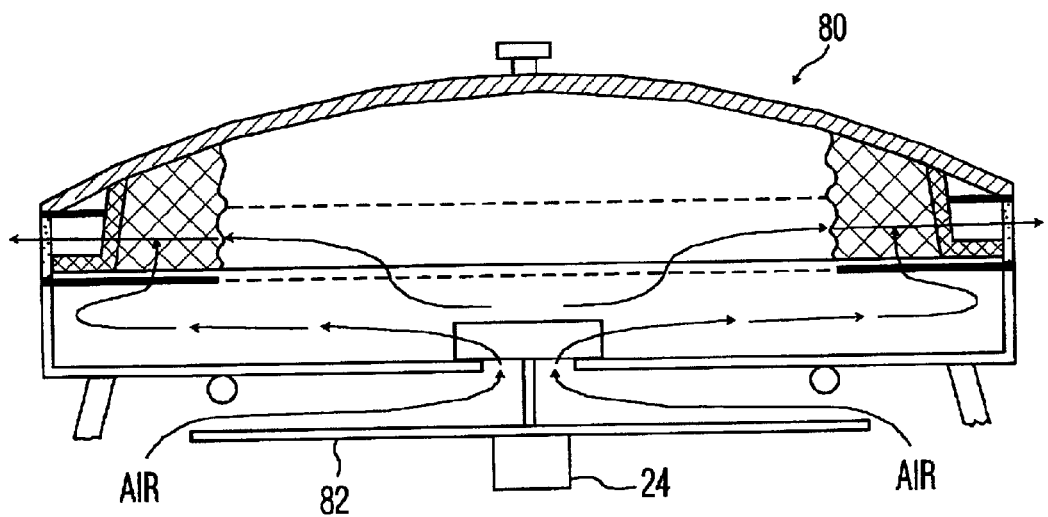
FIG. 8 is similar to FIG. 2 for a further alternate embodiment and showing general blown air flow thereof.

With reference to FIG. 1, a coffee bean roasting system 10 according to the principles of the present invention includes a metal skillet-like pan 12 having a suitable shape and size to accommodate one or more layers of green coffee beans and function as a roasting chamber therefor. In this example pan 12 is circular but could be octagonal, hexagonal, or other suitable shape with a bottom that is generally flat or one which could be slightly sloping toward the center, if desired. Legs 42 support the pan and other assemblies above a counter top or other suitable surface. The pan bottom defines a center opening 14 to enable airflow and accommodate the shaft of motor 24 that drives a radial blower 26 as more fully described below. Brackets or other suitable members (not shown) mount AC motor 24 to the pan such that blower 26 rotates to cause air to draw and to circulate within the roasting chamber.

Pan 12 cooperates with removable transparent cover 14 to close the roasting chamber. Cover 14 is flat or dome shaped and is preferably made of glass although other materials are possible. Cover 14 defines an opening 15 generally at the top thereof. A filter and chaff catcher assembly 16 mounts to top 14 about opening 15. Assembly includes a chaff catching cup 18 the lower portion of which is solid and the upper portion of which is defined by screen 19 with openings of about ⅛ inch that permits the passage of chaff but denies the passage of coffee beans. A solid baffle 21 forces the exhausting gasses downward below the baffle, small mesh screen 9, and an upper screen portion 21 that permits the gasses to pass. A solid top or cover 23 prevents gasses from exhausting out the top of assembly 16. White filter medium 22 serves to filter out smoke particles and odor filter 25 filters most but not all odors so that the operator can smell the aroma of the roasting beans. Filter 25 could be a carbon filter. Filter medium 22 could be selected to be substantially within the range of a 1.0 to 0.1 micron HEPA filter for smoke removal generally available in the industry. The filter opening size would depend upon the size and extent of the smoke particles the manufacturer desires to emit into the ambient. The assembly can be mounted to the glass top or dome by various bonding materials such as epoxies or adhesives and screw type devices to enable removal of chaff and catching cup and occasional filter replacement. It is preferred that the continuous edge of top 14 include a suitable sealing material 31 such as silicones to substantially prevent air circulating within the chamber from escaping between the pan and the dome.

System 10 further includes a control panel 30 that includes certain push buttons or dials 32 that enable the operator to set automatic heat energy and blower applications or manually set or over ride such settings. Power cord 34 provides standard house 110 volt house power or 220 volt power as desired. Power cord 36 provides power and speed control to the motor 24 and power cord 38 provides heat energy to resistive heater coil or cal rod 40 that in turn heats the bottom of pan 12.

In one method example, the unit of FIG. 1 was operated in the manual mode. Approximately one cup of green beans was spread evenly on the bottom of the 12-inch diameter pan 12 with four-inch high sidewalls. Opening 14 was 3 inches in diameter as was the opening in the top of glass dome 14. The blower 26 was a LAU radial blower #C2895767, 3 and $13/16^{th}$ inches by 1 and $1/32^{nd}$ inches high radial blower with 30 back-curved blades, CCW Rotation in plan view.

The glass lid 14 with filtration assembly 16 attached was placed on the pan to close the chamber.

The heating rod 40 was energized for 10–12 minutes at 1400 Watts.

The stationary layer of roasting beans was visible through the glass lid and the sounds (crackling) of roasting were clearly heard. The aroma of roasting coffee beans was discernable without excessive smoke filling the room.

Once the required or sufficient degree of doneness was perceived by sight, smell, sound, and/or time, the heating unit was turned off and the cooling unit (the motor-blower 24–26) was turned on at about 6500 RPM.

Some smoke was visible on the outside of the filtration unit early in the cooling cycle. As the roasted beans were swirled around inside the roasting chamber during the cooling cycle, they were being cooled by the outside drawn and circulating air. As they swirled around, chaff was loosened and deposited into the chaff cup or catcher, and the pressure deferential caused by the motor-blower unit caused the effluent to pass through the $1/8^{th}$ inch grid around the baffle and out through the smoke and odor filters.

After about six to eight minutes of cooling cycle, the beans were cooled sufficiently to stop the roast and retain the previously observed doneness. Due to exothermic processes within the beans they continue to heat up when external heat is removed so they are subject to external cooling slightly before the final roast color is seen. The motor-blower unit was turned off. The glass lid was removed and the roasted beans emptied out and stored in sealed glass jars. Later, as needed, the stored beans were ground and processed into a fresh cup of coffee beverage.

In another method example, cover 14 is removed and a layer or more of green coffee beans is deposited on the floor of pan 12. The operator selects the mode, EG "Manual", and applies power to heating rod or element 40 that, in turn, heats by conduction the bottom of pan 12 and the resting beans. As the beans begin to roast the operator can inspect the bean color and listen to the roasting sounds as desired. In addition, the operator can turn the blower assembly on a relatively slow speed such as 1000 RPMs to force the smoke and steam out through the filter assembly to preserve bean visibility. The radial blower 26 draws outside air in and circulates the air generally as shown in dotted lines in FIG. 1. Because of the slow blower speed and the continued application of heating energy to element 40, the beans remain at rest and continue to absorb roasting energy. During this phase, the blower draws fresh air into the chamber and forces air with smoke and steam out of the chamber in the path shown by the dotted lines. Some chaff that separates from the roasting beans may be carried out with the exhausting air but when the chaff clears the bottom of the baffle 21 it remains at the bottom of the cup 18 due to its weight and inertia. The smoke and steam, however, continue upward and through the filters 22 and 25 and exit the system.

If the operator notes an excessive burning smell or excessive color change in one segment of the bean body, the operator can manually press the stir button on controller 30.

This applies more power to motor 24 which increases the blower speed to cause the beans to fly outward and against the sides of pan 12 and against each other. Some beans would also circulate back toward the center of the pan in a swirling motion. In effect, the beans would be effectively stirred within the chamber. In one example, the high blower speed for a 12-inch pan was 6000 RPM. This stirring cycle should be short, EG about 10 to 20 seconds, so that the body of beans is not significantly cooled but instead retain most of their residual heat. In addition, it is preferred that the power continue to be applied to the element 40 so that the net cooling is reduced during this phase. Also, during this high-speed cycle, most of the chaff is carried up and out of the pan itself and deposited in cup 18. This chaff removal and collection also aids the operator visual inspection of the roasting beans when the beans come to rest. Once the beans are stirred, the operator can manually reduce the blower speed by pressing the appropriate button on counsel 30. Preferably, the controller reduces blower speed gradually so the beans distribute along the pan bottom. This can be done manually by rheostat control or automatically by programmed IC chip in counsel 30. The beans will come to rest on the pan bottom where they will resume their roasting by way of the heat energy applied by conduction through pan bottom. Some of the beans may be piled up at the outer portions of pan 12, but this will not affect the quality of the roasting method and over time, the vibrations of the system will cause those beans to migrate toward the center of the pan bottom. Also, since most beans have one flat side (the other is rounded), they tend to come to rest with flat side down for best conductive heat transfer with pan bottom.

The high and low speed cycles can be repeated as desired by the operator. In one example of the method, the slow speed cycles lasted two-to-three minutes and the high-speed cycles lasted about 20 seconds. Three-to four cycles were needed for fully roasting the beans.

Once the beans were fully roasted, power to rod 40 was cut off and the blower set for high speed. This high-speed cycle is a rapid cool-down cycle to not only rapidly cool the beans to capture flavor but also to separate and carry off the remaining chaff from the stock of roasted beans. This cool-down cycle lasted about 6 minutes in this example.

Alternate Embodiments

An alternate system 50 according to the principles of the present invention is shown in FIGS. 2 to 8 where common reference characters refer to similar elements to system 10. System 50 includes metal pan 62 defining opening 14 in the pan bottom. In one example, the pan was 12 inches in diameter with four-inch high sidewalls. The pan bottom can be high finish aluminum and thick enough to cooperate with rod 40 to provide even heating to the bean layer.

A cover assembly 52 functions to close the roasting chamber, collect floating chaff, and filter most smoke and steam from exiting gases and particles. Assembly 52 preferably includes a glass dome-shaped cover 55 with handle 53 and smoke filter 66 that preferably extends completely around the periphery of the outer edge of cover 55. Filter 66 can be secured to cover 55 by seal 68 to form a single unit raised and lowered by handle 53. In one example seal 68 extends along and is integral with the top of filter 66 and is shaped to releasably mate with the outer edge of glass cover 55. A further seal 64 lines and is integral with the bottom of filter 66 and functions to releasably seal filter 66 of the cover assembly 52 to the top edge of pan 62 when assembly 52 is placed on the pan. Seals 64, 66 can comprise any suitable material such as silicone plastic. Preferably, filter 66 and its seals 64, 68 can be selectively removed from cover 55 to permit cover and filter cleaning and chaff removal as desired. It has been determined that a filter selection that blocks all but 1.0 micron particles is suitable. However, a 0.1 micron filter is preferred to prevent too much smoke for inside use but allow some smoke to exit the system for operator indication of roasting completion by the smell parameter. Alternately, a carbon post-filter can be used in combination therewith. Crackling sounds can also emanate with such filters. Assembly 52 can further include a chaff catcher screen or mesh element 74 having an outward extending floor portion 75 connected to the lower edge of the filter 66 and an upwardly and inwardly extending part 77 that can extend to the inner surface of dome 55, as shown, or be spaced below it. Screen 77 has openings that approximate $\frac{1}{8}^{th}$ inch to enable floating chaff to penetrate the screen but reject beans from such translating through. Any chaff that translates through screen 77 will be blocked from exiting the system by filter 66. Instead, chaff will accumulate in space 78 on the top of floor 75, where they can be discarded after the process is completed. A smaller opening, chaff-blocking screen (not shown) can be placed along the inside surfaces of filter 66 to prevent chaff from jamming the filter ports.

It will be understood that seals 64, 68, filter 66 and screen 74 are shown extending completely about the system periphery as represented by the dashed lines. However, it would be within the scope of the invention for these elements to extend substantially about the periphery so long as they function to remove substantial smoke to permit inside, non-vented use and allow some odor to emanate to aid the operator. By extending completely about the periphery, assembly 52 maximizes the exhaust area, the area to filter the smoke, and the space to catch the chaff. This arrangement also enables the same size filters to be stacked one atop the other (not shown) to increase these capacities even further for restaurant applications or applications where a lot of beans are roasted to a dark color, resulting in a great deal of smoke.

Motor 24 and controller 30 can be mounted to the pan or to the legs or to some frame member (not shown) as desired. Radial blower 70 draws air from outside the system and provides air circulation as further described below. Screen or mesh 72 can be mounted on the floor of the pan about blower 70 or at attached to the blower periphery to prevent beans from engaging the rotating blower blades 73. Only part of screen 72 is shown for simplicity. The motor is positioned so that the blower 70 is inside the heated space. The motor 24 is outside the heated space and in the flow of the incoming cold air stream which keeps the motor cool. A flat baffle or disk, such as 82 of the embodiment of FIG. 8, can be added on top of the motor but below the bottom surface of the pan to keep the motor even cooler and during the final cooling operation to draw cooling air in across the outside bottom surface of the pan, thereby decreasing the cooling cycle time.

In operation, one or more layers of green coffee beans are spread on the floor of pan 62. Power is applied to heating element 40 that heats the bottom of pan 62. The pan bottom, in turn, heats the resting beans by conduction. Simultaneously at the start of the heat application or shortly thereafter, blower 70 is activated at slow speed, EG 1000–1500 RPM, to remove smoke and steam. Blower 70 draws outside air in through opening 14, circulates it outward and circumferentially. See FIG. 3. This relatively slow-moving circulating air carries the smoke and steam in a swirling motion and upward and outward pattern, thence out through screen 74 and filter 66. Note the beans continue to rest and roast for the heat energy applied by element 40 is sufficient to roast the beans regardless of the cooling effect applied by the slow moving air. In addition, the operator can easily visually and audibly monitor the roasting beans for color and crackling sounds because the smoke, steam, and chaff are carried away by the slow moving air, and the slow speed blower generates little noise.

The operator, upon judging that stirring the beans would be beneficial or necessary, can manually control motor 24 to cause blower 70 to rotate at high speed, EG 6500–7000 RPM for a short 10–20 seconds. Blower 70 generates high-speed air drawing and circulation. This action causes the mass of beans to swirl toward the outside portions of the pan 62. However, because blower 70 also applies a circumferential vector component to the blown air, the mass of beans also moves circumferentially about the pan. See FIG. 4 and 6. It is noted that the beans located more toward the pan center move circumferentially more rapidly than beans located more toward the pan outer walls. The main purpose of this swirling action is to stir the beans and to separate chaff and remove chaff and smoke and steam, not to cool the mass of beans because the roasting thereof has not completed. Accordingly, the high-speed blower cycle should be short and the power to element 40 should remain on during these high-speed cycles. With this method of mixing the more-roasted beans which are lighter are thrown up higher than the denser less-roasted beans during mixing. So the less-roasted beans should be closest to the heating surface once a mixing cycle is complete and the beans have redistributed and come to rest.

Once the beans are sufficiently stirred, the operator or the system automatically, shifts the blower to slow speed and the beans come to rest again on the pan bottom. Some beans will initially remain piled up along the sidewall, however, the natural vibration of the system tends to cause the beans to spread out somewhat toward the pan center. To better redistribute beans after stirring, it is preferred to gradually deaccelerate the blower so the centrifugal force is decreased and as the blower slows down beans are deposited in an ever-decreasing circle on the pan bottom. As the blower goes through its resonant speed on the way down, vibration causes the mass of beans to move towards the center from the outside. If desired, the pan bottom can have a slight central, conical slope from the outer edge. A 12-inch pan, may have a 1 to 2 inch descent and a smooth surface inside the pan to distribute the beans across the surface more evenly. The slow and high-speed cycles can be repeated as desired until the beans are fully roasted and show a desired color, sheen, sound, and/or odor. In one example, the slow speed cycles extended for 3–4 minutes and the high-speed cycles extended for about 20 seconds. The beans were fully roasted in 3–4 complete cycles.

Once fully roasted, it is preferred that the beans be quickly cooled to preserve flavor in the beans. System 50 applies rapid cool down by simply operating blower 70 at high speed and cutting power to rod 40. As mentioned above, this action draws cool air into the system, swirls the beans to cool them, and forces heated air out through the filtering system. In one example, the cool down cycle lasted 6–9 minutes. Cover assembly 52 was then removed and the cooled beans placed in jars for storage. These beans were later ground and used to make a fresh coffee beverage.

Although alternating low air speed phase and high air speed phase are mentioned above, it is within the principles of the present invention that other air off phases or intermediate air speed phases and transition phases can be employed with the present systems and methods as desired.

It should be understood that, as long as the amount, coffee type, and required roast result remain the same, parameters can be pre-programmed for the automatic mode of operating systems 10 and 50. Results from these pre-programmed systems would be substantially uniform from roast-to-roast. Systems 10 and 50 are also relatively quiet permitting the operator to hear all crackling sounds. The beans roast while at rest so that the operator can see the color of individual beans, see the slight movement of individual crackling beans, and hear the crackling. The present method also enables the beans to retain a significant amount of their natural oil while eliminating moisture which produces a better-flavored product. A blower wheel with radial and/or curved blades creates a strong current of air to cool the beans, carry the chaff, and enough static pressure head to push air through a 0.1 micron filter. Also, it uniquely creates a swirling motion (not just a radial motion) which rotates and turns over the entire bean mass, thereby cooling and/or mixing the beans very efficiently. With the present system 50, the balance between blower, filter, motor, heater, smoke, cooling are such that this process is balanced and can be based on a 15-amp 115 volts circuit, i.e. standard house power, if desired. The present invention also facilitates a scaled up system so that more coffee beans can be roasted in a given roast cycle. For example, a 24-inch diameter pan can be used with generally a 220-volt 20-amp circuit to roast about 7 pounds of green beans. Also, a drop or rise in line voltage will not significantly affect the roasting cycle because heat transfer is in direct proportion to applied voltage. For example, a ±10% line voltage variation results simply in a ±10% heat transfer variation, which is insignificant to the overall cycle when compared to the known systems fluidized bed or drum type, which rely on radiant heat transfer.

It will be understood that various changes and improvements can be made to the herein disclosed exemplary embodiments without departing from the spirit and scope of the present invention.

I claim:

1. A method of roasting coffee beans in a roasting chamber that includes a pan having a bottom and sidewalls, the method comprising, placing a mass of green coffee beans on the pan bottom in one layer or more layers, heating the pan bottom to transfer heat by conduction from the pan bottom to the one layer for substantially roasting the mass of beans, after the beans are sufficiently roasted, flowing air at high speed through the mass of beans to mix or swirl and cool the roasted beans within the roasting chamber.

2. The method of claim 1 wherein the mass of beans are at rest on the pan bottom during substantial roasting thereof.

3. The method of claim 2, wherein the chamber comprises a transparent portion to allow an operator to visually inspect roasting beans, the method further comprising removing smoke particles and steam from above the roasting mass of beans to enable the operator to better visually inspect individual roasting beans.

4. The method of claim 3, further comprising preventing most of the removed smoke particles from exhausting to the ambient air while exhausting a small amount of smoke particles to the ambient air to enable the operator to use roasting odor as a indication of roasting completion for the mass of beans.

5. The method of claim 4, wherein said preventing step includes flowing air within the chamber to carry the smoke particles through a filter.

6. The method of claim 5, wherein the filter includes openings to enable at least some smoke particles smaller than 0.1 micron to exhaust into the ambient air.

7. The method of claim 3, wherein the mass of beans remain substantially at rest during said removing step.

8. The method of claim 7, wherein said roasting includes transferring heat by conduction from the one layer of beans to any beans resting on the one layer of beans.

9. The method of claim 8, wherein using electric power as the only source of power for flowing the air and for said heating.

10. The method of claim 3, further comprising mixing or circumferentially swirling the mass of beans during said removing step.

11. The method of claim 10, wherein said heating occurs during said mixing or swirling step.

12. The method of claim 3 wherein said removing step includes during a first phase flowing air from the central region of the pan bottom toward the sidewalls, the flowing air speed being insufficient to move the mass of beans.

13. The method of claim 3 wherein said removing step includes during a first phase flowing low speed air from the central region of the pan bottom toward the sidewalls, the low speed air being insufficient to move the resting mass of beans, and during a second phase flowing high speed air from the central region of the pan bottom toward the sidewalls, the high speed air being sufficient to mix or circumferentially swirl the mass of beans.

14. The method of claim 13 wherein the first phase lasts substantially within the period of 2 to 5 minutes and the second phase lasts substantially within the period of 10–30 seconds.

15. The method of claim 14 wherein said heating occurs while the mass of beans remain at rest and while the mass of beans are being mixed or swirled.

16. The method of claim 15 wherein said first phase precedes said second phase and said phases repeat sequentially for the duration of the roasting step.

17. The method of claim 16 wherein a transition between a second phase and a subsequent first phase includes a gradual reduction from flowing high speed air to flowing of low speed air.

18. The method of claim 17 further including vibrating the bottom of the pan at least during said transition to better distribute the mass of beans on the pan bottom after they have been mixed or swirled.

19. The method of claim 13 further comprising collecting chaff carried by the high-speed air at a location separate from the mixing or swirling mass of beans.

20. The method of claim 1 wherein said flowing air moves from the central region of the pan toward the sidewalls.

21. The method of claim 20 wherein said flowing air also flows circumferentially within the pan.

22. The method of claim 19 wherein the flowing air mixes or swirls the mass of beans.

23. The method of claim 22 wherein the flowing air carries chaff away from the mass of beans.

24. The method of claim 23 wherein the flowing air is drawn from the ambient air outside of the pan.

25. The method of claim 24 wherein
the flowing air step lasts substantially within the period of 7–10 minutes for an approximate 1–2 cups of initial mass of green beans.

26. An apparatus for roasting a mass of initially green coffee beans, removing chaff from the mass of beans, and cooling the roasted mass of beans comprising:
a roasting chamber including a surface for supporting a mass of coffee beans in one or more layers,
heating means for selectively heating said surface for roasting the mass of beans substantially by energy transfer from said surface to the one layer of beans while said one layer of beans are substantially at rest on said surface and from the one layer to any other layer of beans substantially resting on said one layer of beans,
air flow means for (i) flowing slow-moving air into the chamber and toward the roasting beans to carry away from the beans smoke and steam, the slow-moving air being insufficient to mix or swirl the mass of roasting beans, and for (ii) flowing high-speed air into the chamber and toward the beans for mixing and swirling the mass of beans to dislodge chaff from the beans and for carrying away from the beans smoke, steam, and chaff, and
control means for operating said airflow means to alternately flow air at slow and high speed rates while the heating means heats said surface and at a high speed to rapidly cool the mass of beans after roasting is completed and said heating means stops heating said surface.

27. An apparatus according to claim 26, wherein said airflow means includes a radial blower.

28. An apparatus according to claim 26, wherein said air flow means generates high speed airflow that moves the mass of beans in patterns that causes some of the mass of beans to contact others of the mass of beans to remove at least some of the chaff from the contacting beans.

29. An apparatus according to claim 26, further comprising filter means for filtering the smoke during the flow of high speed air.

30. An apparatus according to claim 26, further including collection means for collecting the chaff carried by the high-speed airflow.

31. An apparatus according to claim 26, wherein said surface has a central region and a continuous outer edge, and said airflow means directs the airflow from said central region toward the outer edge.

32. An apparatus according to claim 31, wherein said airflow means also direct the airflow to flow circumferentially relative to its rotation axis.

33. An apparatus according to claim 26, further comprising sidewalls integral with said surface for forming a pan.

34. An apparatus according to claim 33, further comprising a cover assembly for closing with said pan to form a roasting chamber.

35. An apparatus according to claim 34, wherein at least a portion of said chamber includes a transparent surface to permit visual inspection of said mass or beans or individual beans of said mass of beans.

36. An apparatus according to claim 35, wherein said airflow means, while generating slow speed airflow draws into said chamber ambient air and exhausts air and smoke from the chamber to enable the operator to visually inspect the color and condition of the roasting beans of said mass of beans while the mass of beans is at rest on said surface.

37. An apparatus according to claim 35, wherein said cover assembly includes a glass cover comprising said transparent surface.

38. An apparatus according to claim 37, wherein said heating means produces smoke and odor in the mass of beans, the apparatus further comprising filter means for filtering the smoke and odor during the flow of high speed air.

39. An apparatus according to claim 38, wherein said cover comprises a cover opening for enabling air to exit said chamber and said filter filters air that leaves the chamber through said cover opening.

40. An apparatus according to claim 39, wherein said cover opening is in the center region of said cover.

41. An apparatus according to claim 38, wherein said cover includes a continuous outer portion and said filter is arranged between said continuous outer portion and said sidewalls.

42. An apparatus according to claim 41, wherein said filter extends substantially completely around said sidewalls and said continuous outer portion.

43. An apparatus according to claim 41, further including collection means for collecting chaff carried by the airflow.

44. An apparatus according to claim 43, wherein said collection means is located contiguous to said continuous outer portion and said filter.

45. An apparatus according to claim 26, wherein said heating means includes an electric resistance element.

46. An apparatus according to claim 45, wherein said airflow means includes an electrically powered radial blower mounted for rotation relative said surface.

47. An apparatus according to claim 46, wherein said surface is non-porous except for an opening through which said blower can draw cool ambient air for generating the airflow.

48. A method of roasting and cooling a mass of coffee beans and removing smoke and chaff from the mass of beans comprising:

forming a mass of green coffee beans on a surface, roasting the mass of beans while they are at rest on the surface substantially by conduction heat transfer from the surface to the mass of beans cooling the mass of beans and during the cooling step removing chaff from the mass of beans.

49. The method of claim 48, further comprising removing the chaff from the mass of beans during the cooling step.

50. The method of claim 48, wherein said removing step includes maintaining the surface stationary and applying an air stream for moving the mass of beans relative to said surface.

51. The method of claim 50, wherein the airstream moves the mass of beans relative to the surface in patterns that causes some beans to contact other beans.

52. The method of claim 48, further comprising producing smoke and odor during the roasting step and filtering the smoke during the cooling step.

53. An apparatus for roasting and cooling a mass of green coffee beans, cooling the roasted mass of beans and removing chaff from the mass of roasted beans comprising:

a surface for supporting a mass of green coffee beans in one or more layers, heating means for heating said surface for roasting the mass of green coffee beans substantially by conduction heat transfer between said surface and the one layer of beans and from the one layer to any beans resting on the one layer of said mass of beans airflow means for cooling the mass of roasted beans and removing chaff from the mass of beans, said airflow means includes a radial blower, and wherein said surface has a central region and a continuous outer edge, and said blower directs the airflow from said central region toward the outer edge, control means to operate said blower to generate a high speed airflow and a low speed airflow said high speed airflow for mixing or swirling the mass of beans and the low speed air flow being insufficient to mix or swirl the mass of beans, sidewalls integral with said surface for forming a pan, a cover assembly for closing with said pan to form a roasting chamber, at least a portion of said chamber includes a transparent surface to permit visual inspection of said mass of beans or individual beans of said mass of beans, and wherein said cover assembly includes a glass cover comprising said transparent surface, and wherein said heating means produces smoke and odor in the mass of beans, the apparatus further comprising filter means for filtering the smoke and odor during the flow of high speed air, and said cover includes a continuous outer portion and said filter is arranged between said continuous outer portion and said sidewalls, said filter extending substantially completely around said sidewalls and said continuous outer portion.

54. The apparatus of claim 26 wherein said airflow means includes air blower blades mounted for rotation within said chamber, said chamber having an opening through which the blower blades, when rotating, draw ambient air into the chamber to flow said slow-moving air and to flow said high-speed air.

55. The apparatus according to claim 54 further including screening means for blocking beans from engaging said blower blades during rotation thereof.

* * * * *